March 20, 1945.　　　　B. H. SMITH　　　　2,372,127
ELECTRICAL MEASURING DEVICE
Filed Dec. 2, 1941
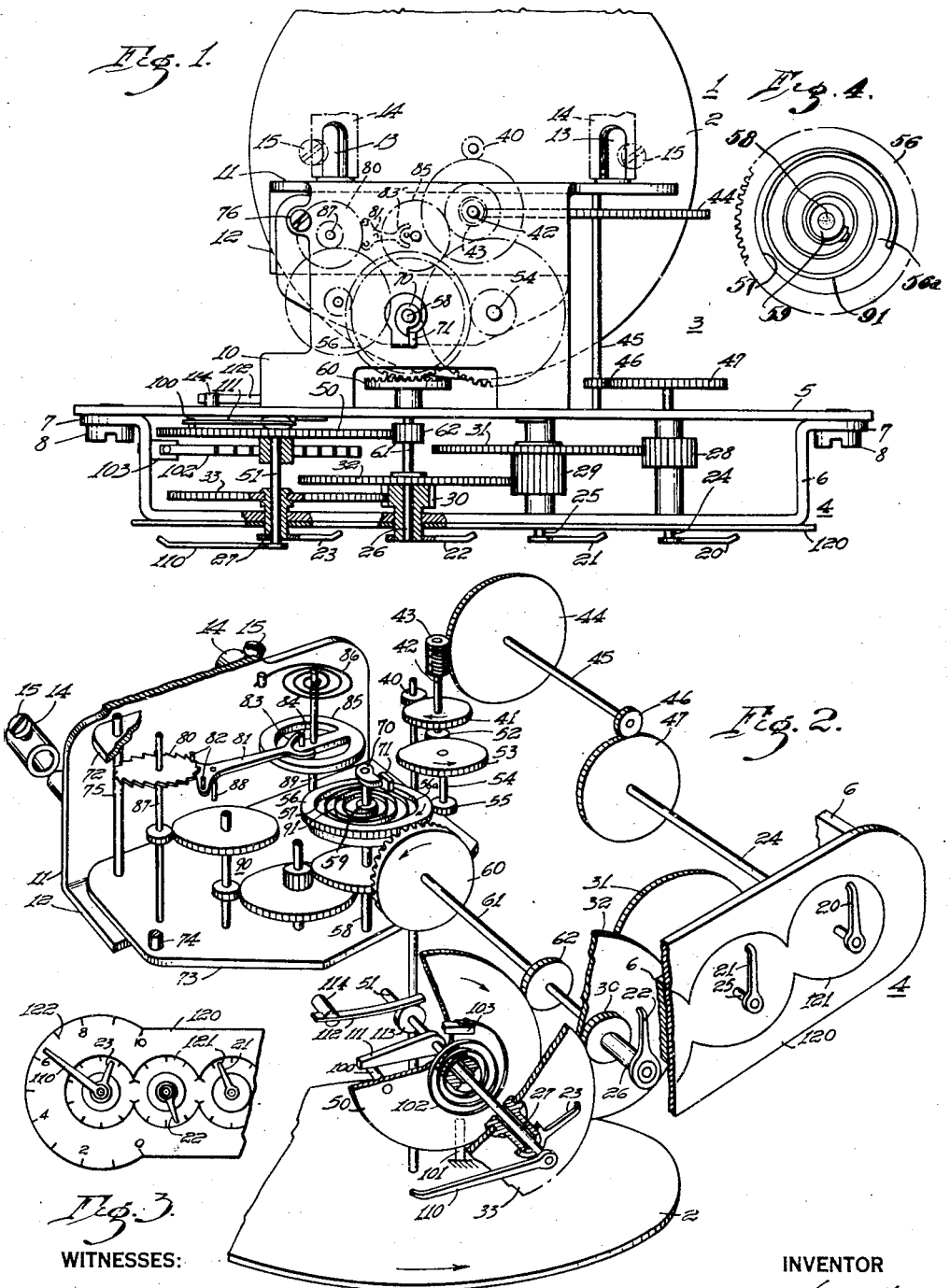
WITNESSES:
INVENTOR
Benjamin H. Smith.
BY
ATTORNEY Patented Mar. 20, 1945

2,372,127

UNITED STATES PATENT OFFICE 2,372,127

ELECTRICAL MEASURING DEVICE

Benjamin H. Smith, Bloomfield, N. J., assignor to Westinghouse Electric & Manufacturing Company, East Pittsburgh, Pa., a corporation of Pennsylvania Application December 2, 1941, Serial No. 421,312

3 Claims. (Cl. 171—34)

This invention relates to electrical measuring devices, and it has particular relation to devices for measuring the integrated and maximum demand values of a variable electrical quantity.

As electrical loads continue to increase, it becomes more desirable to provide measurements of electrical quantities which show both the integrated values thereof and the maximum demand values thereof. Such devices commonly are employed for measuring electrical energy in watthour units.

Prior art maximum demand watthour meters generally include a watthour meter having detachably associated therewith a maximum demand register. The maximum demand register is provided with timing mechanism in the form of a small synchronous electrical motor. The timing mechanism may be employed for either of two purposes. If the associated maximum demand register is of the time lagged type, the timing mechanism is employed to provide a constant rate of rotation against which the rate of rotation of a watthour meter armature is compared. A maximum demand register of this type is disclosed in my Patent No. 2,003,016.

In a second form of maximum demand register, the timing mechanism is employed for periodically interrupting the coupling between a watthour meter armature and a maximum demand measuring member. Such a register is known as a block interval maximum demand register. It registers the electrical energy or watthour consumption over a predetermined interval, such as 15 or 30 minutes. A register of this type is disclosed in the R. H. Lewis et al. Patent No. 2,047,376.

Although maximum demand registers of the types disclosed in the aforesaid patents operate satisfactorily, the necessity for providing energization for the synchronous motors renders them less adaptable for installation on watthour meters and removal therefrom. When such a register is attached to a watthour meter, connections must be established from the circuit to which the watthour meter is connected to the synchronous motor. Furthermore, when the register is to be removed from a watthour meter for servicing or for other reasons, the electrical connection between the synchronous motor and its source of energy must be broken.

A further objection to the synchronous motor is that it is in continuous operation at all times, even though electrical energy is not flowing through the associataed watthour meter. Although the synchronous motor has a small energy consumption, the continuous supply of energy thereto is somewhat objectionable.

Instead of the synchronous motor, it is possible to employ a clock mechanism for providing the desired timing. However, clock timing mechanisms generally are bulky and have appreciable weight. For these reasons, such clock mechanism is not suitable for many watthour meter installations wherein space is restricted and wherein a detachable register construction is desired. A further objection to clock mechanism is the requirement for periodic winding thereof. Since maximum demand registers must be operated over long periods without attention, mechanism requiring periodic winding is objectionable.

In accordance with the invention, a maximum demand register for watthour meters is provided with an escapement timing mechanism. This mechanism is energized from an energy storage device which may be in the form of a spiral spring. Storage of energy in the spiral spring is effected by coupling the spring through a slip type coupling to the armature of the watthour meter. Because of the presence of the slip type coupling, the spring does not interfere with continuous rotation of the watthour meter armature.

In accordance with a further aspect of the invention, a register is provided with an integrating section and a maximum demand section. These sections have telescopically or concentrically related rotating parts. Such a relationship of the parts contributes to the compactness of the register. Moreover, this relationship of the parts permits the adoption of concentric integrating and maximum demand scales which further contributes to the compactness of the register.

It is, therefore, an object of the invention to provide a compact device for integrating and measuring the maximum demand of a variable electrical quantity.

It is a further object of the invention to provide a maximum demand register for a measuring device wherein escapement timing mechanism is provided which is energized from the measuring device.

It is another object of the invention to provide a maximum demand register for a watthour meter wherein an energy storage device is coupled to the armature of a watthour meter through a slip type coupling.

It is a still further object of the invention to provide a maximum demand watthour meter having a register provided with an integrating section for integrating rotation of the watthour meter armature and having a maximum demand section for indicating the maximum demand of energy measured by the watthour meter, wherein the sections have concentric or telescopically related parts.

Other objects of the invention will be apparent from the following description taken in conjunction with the accompanying drawing, in which:

Figure 1 is a view in top plan with parts broken away of a measuring device embodying the invention;

Fig. 2 is a view in perspective with parts broken away of the measuring device shown in Fig. 1;

Fig. 3 is a fragmentary view in front elevation showing a portion of the dial and pointer assembly of the device shown in Fig. 1; and Fig. 4 is a detail view in top plan of a portion of the measuring device of Fig. 1.

Referring to the drawing, Figure 1 shows a measuring instrumentality having a part rotating in accordance with a variable electrical quantity to be measured. Although this instrumentality may vary appreciably, for the purpose of discussion it is assumed that the measuring instrumentality 1 is an induction watthour meter, represented in Fig. 1 by its armature disk 2.

In order to indicate or record the revolutions of the armature disk 2, a register 3 is detachably associated with the watthour meter 1. The register 3 includes a face plate 4 which is spaced from a base plate 5. These plates may be maintained suitably in spaced relation as by providing the face plate 4 with legs 6 having flanges 7. The flanges may be attached to the base plate 5 in any suitable manner, as by machine screws 8 which pass through the flanges 7 and which are received in threaded openings in the base plate 5. The register 3 also includes a rearwardly extending supporting structure which includes a top wall 10 attached to the base plate 5 in any suitable manner, such as brazing or riveting. The top wall 10 may be formed from a plate which is bent to provide a rear wall 11 and a bottom wall 12.

In order to associate detachably the register 3 with the watthour meter, the rear wall 11 may be provided with a pair of spaced attaching pins 13. These pins are received in sockets 14 carried by the watthour meter in fixed position. Each of the sockets 14 may include a set screw 15 which is operable for securing the associated pin in mounted position. To mount the register 3 in operative position, the pins 13 are merely inserted in the sockets 14, and the set screws 15 are actuated to secure the pins in mounted position. To detach the register, the reverse procedure is followed.

For providing an indication of the integrated electrical energy supplied through the watthour meter, a plurality of integrating pointers 20, 21, 22, and 23 are rotatably supported by the register 3. Each of the integrating pointers is mounted on a shaft 24, 25, 26, or 27 which extends through a bearing opening in the face plate 4. Pinions 28, 29, and 30 are carried, respectively, by the shafts 24, 25, and 26. Gears 31, 32, and 33 are carried, respectively, by the shafts 25, 26, and 27 for engaging, respectively, the pinions 28, 29, and 30.

The pinions and gears are so related that the pointers 22, 21, and 20 rotate at rates which are multiples of the rate of rotation of the pointer 23. For example, the pointers 22, 21, and 20 may be designed to rotate, respectively, 10 times, 100 times, and 1000 times for each revolution of the pointer 23. Therefore, if the pointer 20 is designed to rotate in accordance with units of the electrical energy measured by the associated watthour meter, the pointers 21, 22, and 23 rotate, respectively, in accordance with multiples of these units. The relationship existing between the pointers is well known in the art.

To actuate the integrating pointers 20, 21, 22, and 23 in accordance with the rotation of the armature disk 2, a pinion 40 carried by the armature disk is coupled to the integrating pointers through suitable gearing. To this end, the pinion 40 meshes with a gear 41 which is mounted on a shaft 42 for rotation therewith. The shaft 42 extends between the top wall 10 and the bottom wall 12 and is rotatably supported thereby. A worm gear 43 fixed to the shaft 42 engages a worm wheel 44 which is fixed to a shaft 45. As shown in Fig. 1, the shaft 45 extends between the rear wall 11 and the base plate 5 and is rotatably supported thereby. At its forward end, the shaft 45 carries a pinion 46 which meshes with a gear 47 attached to a reduced extension of the shaft 24. By tracing through this gearing, it will be observed that the integrating pointers 20, 21, 22, and 23 are actuated in accordance with rotation of the armature disk 2.

For measuring the maximum demand of electrical energy flowing through the watthour meter, a maximum demand member 50 is provided on a shaft 51. The maximum demand member 50 is rotatable relative to the shaft 51. The maximum demand member 50 is in the form of a gear which is coupled to the pinion 40 for rotation in accordance with rotation of the armature disk 2. This coupling includes a pinion 52 which is fixed to the shaft 42 for rotation therewith. The pinion 52 meshes with a gear 53 which is mounted on a shaft 54. The shaft 54 extends between the walls 10 and 12 and is rotatably supported thereby. A pinion 55 is secured to the shaft 54 and engages a gear 56. This gear 56 is provided with a recess 56a bounded by a cylindrical surface 57 for a purpose hereinafter set forth. The gear 56 is mounted on a shaft 58 for rotation relative thereto. Such mounting may be effected by fixing a collar 59 to the shaft 58 above the gear 56, and by positioning a similar collar, not shown, beneath the gear 56. These collars prevent axial movement of the gear relative to the shaft but permit rotation of the gear relative to the shaft 58.

Rotation of the gear 56 effects rotation of a crown gear 60 which meshes therewith. This crown gear is fixed to a shaft 61 having a pinion 62 thereon for engaging the maximum demand member or gear 50. By tracing this gearing, it will be observed that rotation of the armature disk 2 effects rotation of the maximum demand member 50. The direction of rotation of the armature disk 2, and the gears 41, 53, 56, 60, and 50 are indicated by arrows on the respective parts.

In order to conserve space, certain of the parts may be concentrically or telescopically related. For example, the shaft 26 for the integrating pointer 22 may be provided with a bearing passage for receiving the shaft 61. Consequently, the shafts 26 and 61 cooperate in a small space to support their respective gears and pinions.

In a somewhat similar manner, the shaft 51 may extend into a bearing passage provided in the shaft 27. It should be observed that the shafts 26 and 27 are relatively slow speed shafts compared to the shafts 24 and 25. The telescopic construction preferably is applied to the slower speed shafts.

In order to provide an indication of maximum demand, it is desirable that rotation of the armature disk 2 be compared to a constant rate of rotation or that the rotation of the armature disk be measured for each of a plurality of equal predetermined time intervals. These operations are provided by time lagged or block interval demand registers, as more fully described in the aforesaid patents. For the purpose of discussion, it is assumed that the maximum demand member 50 is operated during each of a plurality of demand intervals in accordance with the block interval principle. For this purpose, it is desirable that a clutch or separable gears be included in the coupling between the maximum demand member 50 and the armature disk 2 in order to interrupt the coupling therebetween at the end of each demand interval. In the specific embodiment herein disclosed, the gear 56 is mounted for movement into and out of engagement with the crown gear 60.

Movement of the gear 56 into and out of engagement with the crown gear 60 is effected by a cam 70 which is carried by the shaft 58 for rotation therewith. This cam 70 projects through an opening in the top wall 10 (Fig. 1) and coacts with a lug 71 carried by the top wall.

The shaft 58 extends between a pair of parallel plates 72 and 73. These plates are supported in spaced relationship in any suitable manner, as by a plurality of spaced posts 74 to which the plates are secured in any desired manner, as by machine screws (not shown). The plates 72 and 73 also carry a shaft 75 which extends between the walls 10 and 12 and which is supported by these walls for rotation relative thereto. To this end, the walls may be provided with bearing screws 76 (Fig. 1) for receiving the ends of the shaft 75. From this brief description, it will be understood that the plates 72 and 73 constitute a framework positioning the shaft 58 and the gear 56 for pivotal movement about the axis of the shaft 75.

During each rotation of the shaft 58, the cam 70 engages its coacting lug 71 to pivot the gear 56 about the axis of the shaft 75 sufficiently to carry the gear 56 out of engagement with the crown gear 60. Such movement is not sufficient to carry the gear 56 out of engagement with its pinion 55.

The rate of rotation of the shaft 58 is determined by the demand interval desired for the maximum demand register. In conventional practice, demand intervals of 15 or 30 minutes generally are employed. Therefore, if a 15 minute demand interval is desired, the shaft 58 is rotated at the rate of one revolution in 15 minutes. With such a design, the cam 70 engages its lugs 71 once in each 15 minute interval to separate the gear 56 from the crown gear 60.

For timing the rotation of the shaft 58, an escapement timing mechanism is provided which includes an escapement gear 80, an escapement lever 81 having escapement teeth 82 cooperating with the escapement gear 80, and having a fork 83 cooperating with a pinion 84 carried by a balance wheel 85. A hair-spring 86 is associated with the balance wheel for determining the period of oscillation thereof. The escapement wheel 80, the escapement lever 81, and the balance wheel 85 are carried, respectively, by shafts 87, 88, and 89 which are supported for rotation by the plates 72 and 73.

The shaft 58 is coupled to the shaft 87 of the escapement wheel through suitable gearing 90 which is supported for rotation by the plates 72 and 73. Consequently, the rate of rotation of the shaft 58 is determined by the escapement timing mechanism.

For actuating the shaft 58 and for energizing the escapement timing mechanism, an energy storage device is provided which may be in the form of a spiral spring 91. This spiral spring may be disposed in the recess 56a formed in the gear 56.

As previously pointed out, it is desirable that energy be stored in the spring 91 by operation of the armature disk 2. To this end, the spring 91 may be coupled to the armature disk 2 through a suitable slip clutch or slip coupling. Such a coupling may be provided by establishing a frictional engagement between one end of the spiral spring 91 and either the shaft 58 or the gear 56. In the specific embodiment illustrated in the drawing, the inner end of the spiral spring 91 is firmly secured to the collar 59 carried by the shaft 58. The outer end of the spring 91 is biased into frictional engagement with the cylindrical wall 57 formed on the gear 56. With such a construction, rotation of the armature disk 2 operates to rotate the gear 56 and store energy in the spiral spring 91. When the energy storage in the spring tends to exceed a predetermined value, the outer end of the spiral spring slips with reference to the gear 56 to permit continued rotation of the armature disk 2 without imposing an undue load thereon.

The storage of energy in spring 91 operates to bias the shaft 58 for rotation. However, rotation of the shaft 58 is restricted by operation of the associated escapement timing mechanism to a rate of one revolution in 15 minutes, if a 15 minute demand interval is desired. During each of these demand intervals, the cam 70 engages the lug 71 to separate temporarily the gears 56 and 60.

When the gears 56 and 60 separate, it is desired that the maximum demand member or gear 50 be returned to a predetermined or zero setting wherein a pusher pin 100 carried thereby engages a fixed stop 101. To this end, the maximum demand member 50 may be provided with a spiral spring 102 having its inner end connected to the gear 50 and its outer end connected to a fixed support 103. This spring is disposed to urge the maximum demand member in a counterclockwise direction, as viewed in Fig. 2. Consequently, when the gears 56 and 60 temporarily separate, the spring 102 urges the maximum demand member 50 to its predetermined or zero position wherein the pusher pin 100 engages the fixed stop 101. From this description, it will be appreciated that the maximum demand member 50 is coupled to the armature disk 2 for rotation to a degree dependent upon the total rotation of the armature disk 2 for a 15 minute demand interval.

It is desirable that an indication of the maximum rotation of the maximum demand member 50 be obtained during a billing period, which may be of one month duration. Such an indication may be obtained by associating a maximum demand indicator such as a pen or a pointer with the maximum demand member 50. In the specific embodiment herein disclosed, the shaft 51 is extended through the shaft 27 and provided at its outer end with a maximum demand pointer 110. The shaft 51 also is provided with a lever 111 which is positioned in the path of movement of the pusher pin 100. Consequently, as the maximum demand member or gear 50 rotates, the pusher pin 100 engages the lever 111 to rotate the shaft 51 and the pointer 110. The shaft 51 and the pointer 110 are held in any position to which they are rotated, in any suitable manner, as by a leaf spring 112 which engages the peripheral surface of a disk 113 carried by the shaft 51. The leaf spring 112 is secured to a fixed support 114. The spring 112 is adjusted into light resilient engagement with the disk 113. Because of the frictional engagement between the spring and disk, the pointer 110 is held in any position to which it is rotated. Such frictional engagement is not sufficient to impose undue load on the mechanism.

For indicating the quantities measured by the register, a dial plate 120 may be carried by the front plate 4. This dial plate is provided with scales 121 for the integrating pointers 20, 21, 22, and 23. In addition, the dial plate 120 is provided with a scale 122 for the maximum demand pointer 110. The scale 122 is shown concentric with the scale 121 associated with the slowest moving pointer 23. These scales may be calibrated to indicate the integrated and maximum demand values measured by the pointers 20, 21, 22, 23, and 110.

It is believed that the operation of the register is apparent from the foregoing description. When the measuring instrumentality 1 is connected to measure the desired electrical quantity, such as electrical energy, the armature disk 2 rotates in accordance with the electrical energy to be measured. Rotation of the armature disk 2 operates to rotate the integrating pointers 20, 21, 22, and 23 in accordance with the integrated value of the electrical energy.

In addition, rotation of the armature disk 2 serves to rotate the maximum demand member 50. Furthermore, rotation of the armature disk 2 operates to store energy in the spiral spring 91. Stored energy in the spring 91 serves to energize the escapement timing mechanism which preferably is of the self-starting type. Should the storage of energy in the spiral spring 91 tend to exceed a predetermined value, the gear 56 slips with respect to the spiral spring to permit continued operation of the armature disk 2 without undue loading thereof. The maximum energy stored in the spring 91 prior to slipping of the gear 56 relative thereto may vary appreciably. As an example, the spring may be designed for a maximum energy storage sufficient in itself to drive the escapement mechanism for several minutes.

Under control of the escapement timing mechanism, the cam 70 rotates to engage the lug 71 and pivot the gear 56 about the axis of the shaft 75 at the end of a demand interval which may be of 15 minutes duration. The resulting movement of the gear 56 carries the gear out of engagement with the crown gear 60 and permits the spiral spring 102 to rotate the maximum demand member 50 counterclockwise to its predetermined or zero position. The tip of the cam 70 then clears the lug 71 after a brief interval to permit reengagement of the gears 56 and 60 to start a succeeding demand interval. During this succeeding demand interval, if the pusher pin 100 fails to exceed its previous maximum movement, the lever 111 and the pointer 110 remain unaffected. However, if the demand during any interval exceeds any previous demand during the billing period, the pusher pin 100 engages the lever 111 to push the pointer 110 further up scale. Consequently, the pointer 110 indicates the maximum movement of the gear 50 and the maximum demand of electrical energy for any 15 minute demand interval occurring during a billing period. At the end of the billing period, the reading of the pointer 110 on a scale 122 may be noted, and the pointer 110 may then be returned manually toward its zero position until the lever 111 engages the pusher pin 100. This conditions the register for another billing period.

By inspection of Fig. 2, it will be observed that the reaction of the spiral spring 91 is in such a direction that it urges the gear 56 resiliently into engagement with the crown gear 60. This arrangement of the spiral spring eliminates the need for an additional spring to assure coupling of the gears 56 and 60.

In operation, the register 3 imposes a slight additional load on the armature disk 2. This load varies slightly in accordance with the amount of energy stored in the spiral spring 91. However, the effects of this additional load may be compensated substantially for light load operation of the armature disk 2 by suitable manipulation of the light load adjustment commonly provided for watthour meters. When the armature disk 2 operates at higher loading, such as above 50% of normal load, a slight drag imposed by the register 3 may be fully compensated by suitable manipulation of the full load adjustment provided on watthour meters. By this procedure, it is possible to maintain the accuracy of the measuring device well within acceptable commercial limits.

Although the invention has been described with reference to certain specific embodiments thereof, numerous modifications are possible. Therefore, the invention is to be restricted only by the appended claims when interpreted in view of the prior art.

I claim as my invention:

1. In a maximum demand measuring device for measuring the maximum demand of a variable electrical quantity, a measuring instrument having a part rotatable in accordance with a variable electrical quantity to be measured, a maximum demand member, means coupling said maximum demand member to said part for operation therefrom, said means including first gear means associated with said part, and second gear means associated with said demand member, and means for temporarily interrupting the coupling between said first and second gear means at predetermined intervals, said last-named means including a gear element coupled to said first gear means for rotation therewith, means mounting said gear element for rotation into and out of coupling engagement with said second gear means while engaging said first gear means, a cam element, means mounting said cam element for rotation, means for rotating said cam element including a spiral spring coupling said cam element to said gear element, said spiral spring having at least one end coupled frictionally to one of said elements, whereby when the energy storage in said spring tends to exceed a predetermined value said spiral spring slips to permit continuous rotation of said gear element, said spiral spring being so related to said gear element that the spring reaction tends to urge said gear element into engagement with said second gear means, escapement mechanism for controlling the rate of rotation of said cam element, and means responsive to rotation of said cam element for temporarily moving said gear element out of engagement with said second gear means at predetermined intervals, and means biasing said demand member towards a predetermined position for urging said demand member towards said predetermined position during the periods of disengagement of said gear element with said second gear means.

2. In a maximum demand measuring device for measuring the maximum demand of a variable electrical quantity, an electrical measuring instrument having a part designed for rotation in accordance with a variable electrical quantity to be measured, a maximum demand member, means coupling said maximum demand member to said part for operation therefrom, said means including first coupling means associated with said part, second coupling means associated with said demand member, and means for temporarily interrupting the coupling between said first and second coupling means at predetermined intervals, said interrupting means including a coupling element coupled to said first coupling means for rotation therewith, means mounting said coupling element for rotation into and out of coupling engagement with said second coupling means while in coupling engagement with said first coupling means, energy storage means having a slip coupling connection to said first coupling means, whereby when the energy stored in said energy storage means tends to exceed a predetermined value said slip coupling slips to permit continuous rotation of said part, said energy storage means being so related to said coupling element that the energy reaction of said energy storage means tends to urge said coupling element into engagement with said second coupling means.

3. In a maximum demand measuring device for measuring the maximum demand of a variable electrical quantity, an electrical measuring instrument having a part designed for rotation in accordance with a variable electrical quantity to be measured, a maximum demand member, means coupling said maximum demand member to said part for operation therefrom, said means including first coupling means associated with said part, second coupling means associated with said demand member, and means for temporarily interrupting the coupling between said first and second coupling means at predetermined intervals, said interrupting means including a coupling element coupled to said first coupling means for rotation therewith, means mounting said coupling element for rotation into and out of coupling engagement with said second coupling means while in coupling engagement with said first coupling means, energy storage means having a slip coupling connection to said first coupling means, whereby when the energy stored in said energy storage means tends to exceed a predetermined value said slip coupling slips to permit continuous rotation of said part, said energy storage means being so related to said coupling element that the energy reaction of said energy storage means tends to urge said coupling element into engagement with said second coupling means, timing means energized from said energy storage means, and means controlled by said timing means for temporarily actuating said coupling element out of coupling engagement with said second coupling means at predetermined intervals, and means for indicating the maximum movement of said second coupling element during said intervals.

BENJAMIN H. SMITH.